United States Patent [19]
Dunnill et al.

[11] 3,732,982
[45] May 15, 1973

[54] APPARATUS FOR USE IN CONTINUOUS LIQUID CHROMATOGRAPHY

[75] Inventors: Peter Dunnill, London; Malcolm Douglas Lilly, Orpington, both of England

[73] Assignee: National Research Development Corporation, London, England

[22] Filed: Mar. 31, 1971

[21] Appl. No.: 129,666

[30] Foreign Application Priority Data

Apr. 3, 1970 Great Britain.....................16,006/70

[52] U.S. Cl. ............................................210/198 C
[51] Int. Cl. ..............................................B01d 15/08
[58] Field of Search .......................210/31 C, 198 C, 210/377, 405; 55/197, 386

[56] References Cited
UNITED STATES PATENTS

| | | | |
|---|---|---|---|
| 3,077,103 | 2/1963 | Heaton | 55/197 X |
| 3,257,781 | 6/1966 | Nebbrecht et al. | 55/197 X |
| 3,630,371 | 12/1971 | Harina | 55/386 X |

*Primary Examiner*—John Adee
*Attorney*—Cushman, Darby and Cushman

[57] ABSTRACT

A liquid mixture to be separated and an eluting agent are continuously fed to the top of a vertically extending chromatographic column, the former being supplied at a restricted region which is rotated round the column and the latter being supplied uniformly through a buffer reservoir which communicates with the column via a porous barrier. The liquid is pumped through the column and discharges from the base through a series of uniformly distributed output channels, which are scanned by a multi-channel distributor comprising a series of ducts rotated in synchronism with the mixture supply.

2 Claims, 1 Drawing Figure

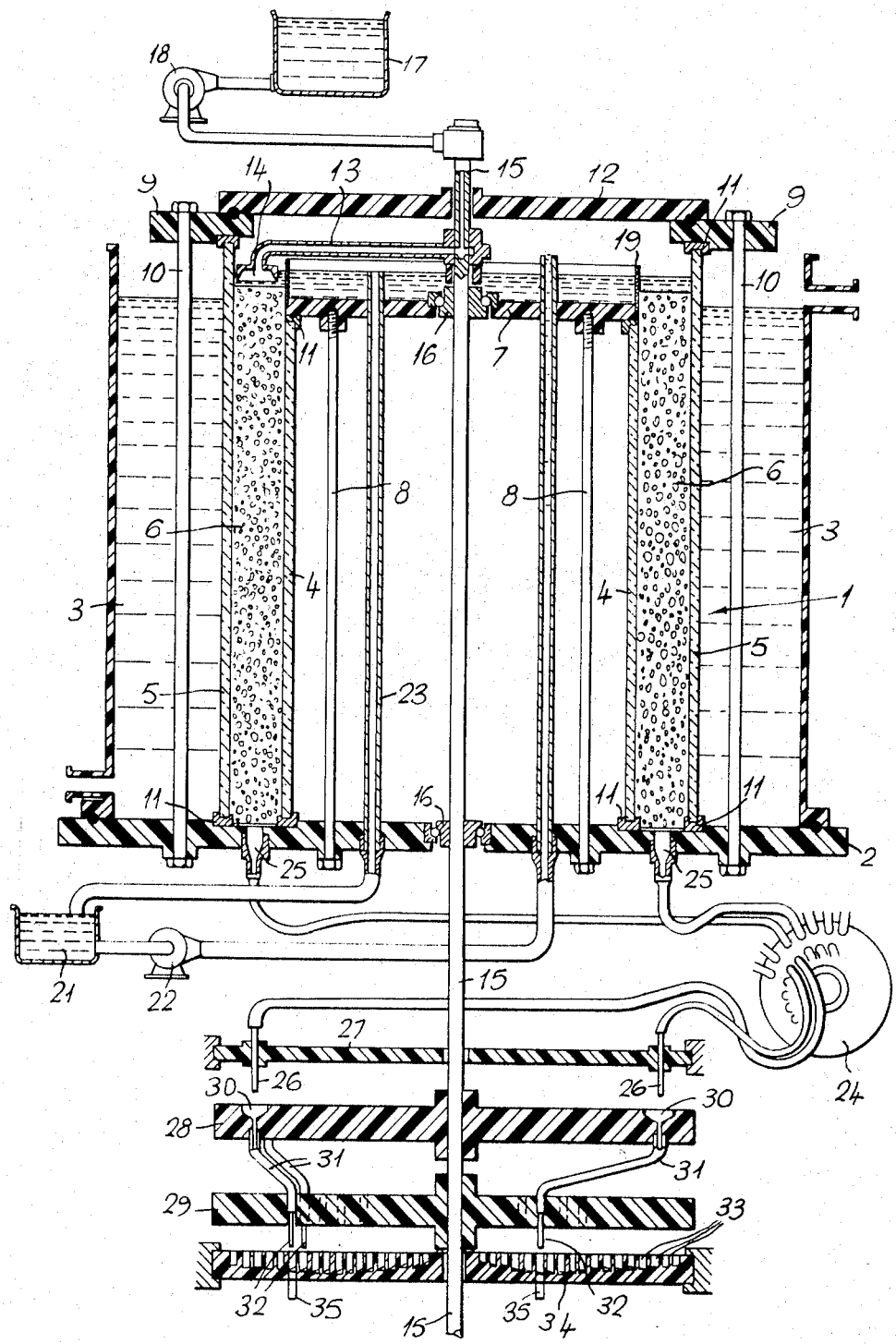

APPARATUS FOR USE IN CONTINUOUS LIQUID CHROMATOGRAPHY

This invention relates to apparatus for use in continuous liquid chromatography, of the kind comprising an annular column arranged with its axis vertical and having a multiplicity of output channels respectively arranged to discharge fractions of the column effluent derived from different regions distributed uniformly around the base of the column, a first liquid feeding means for continuously feeding a mixture to be separated to a restricted region at the top of the column, a second liquid feeding means for continuously feeding an eluting agent uniformly to the whole of the top of the column, and means for bringing about uniform relative rotation around the axis of the column between the first feeding means and the column.

In use of such an apparatus, as a result of the continuous traverse of the input region around the circumference of the column a given constituent of a mixture being separated is present in the column in a spiral configuration which moves round the column synchronously with the rotation of the first feeding means, the pitch of the spiral being dependent on the rate of progress of the constituent down the column so that different constituents of the mixture emerge from different regions at the base of the column; since these regions move continuously around the circumference of the column, in order to collect the constituents separately, it is necessary to provide a multichannel distributor arranged to scan the output channels of the column synchronously with the rotation of the first feeding means, each constituent then being directed into a given channel or group of channels of the distributor.

Several specific forms of apparatus of the kind specified have been proposed, but for various reasons none appears capable of reliable operation over long periods at relatively high rates of throughput. It is accordingly an object of the invention to remedy this deficiency.

According to the invention, in an apparatus of the kind specified the flow of liquid through the column is arranged to be effected by pumping, and the second feeding means includes a buffer reservoir which communicates with the top of the column via a porous barrier.

With such an arrangement the use of pumping instead of gravity to effect the flow of liquid through the column enables precise control of flow rates to be achieved over long periods, with even distribution of the flow between the output channels, while the arrangement of the second feeding means is such as to avoid difficulties arising due to turbulence at high flow rates.

For large scale apparatus, it will normally be necessary to maintain the column stationary and to effect the relative rotation by movement of the first feeding means. This requires that the distributor should also be moved, and a feature of the invention relates to the design of a distribution system suitable for use in this case.

In this system, the output channels of the column terminate in a series of nozzles arranged to discharge liquid downwardly and disposed symmetrically around a vertical axis, and the apparatus further comprises a series of ducts rotatable about said vertical axis in synchronism with the rotation of the first feeding means and a stationary receiving member having formed in it a series of upwardly facing circular grooves all centered on said vertical axis, the ducts and grooves both being equal in number to said output channels and the ducts respectively having inlets disposed symmetrically around said vertical axis below the series of nozzles so that each duct will receive liquid discharged in succession from the series of nozzles and respectively having outlets disposed above the receiving member at different distances from said vertical axis such that each duct will discharge into one groove.

One arrangement in accordance with the invention will now be described by way of example with reference to the accompanying drawing, which is a side view, partly diagrammatic and partly in section, of an apparatus for use in continuous liquid chromatography.

Referring to the drawing, the apparatus includes an annular column 1 mounted on a fixed baseplate 2 and surrounded by a water jacket 3 so that the operating temperature can be maintained at a desired value. The column 1 comprises two coaxial vertically extending glass tubes 4 and 5 whose lower ends are sealed to the plate 2, the space between the tubes 4 and 5 being filled with a bed 6 of a suitable chromatographic material, for example a gel filtration medium. The bed 6 may suitably have a height of about 30 centimeters, a mean diameter about half its height, and a volume of about 5 liters. The upper end of the inner glass tube 4 is sealed to a circular plate 7, secured to the plate 2 by means of rods 8, and the upper end of the outer glass tube 5 is sealed to an annular plate 9, secured to the plate 2 by means of rods 10. The seals between the tubes 4 and 5 and the plates 2, 7 and 9 are effected by means of rubber gaskets 11 which fit tightly on the ends of the tubes 4 and 5. The plate 9 is also sealed to a detachable cover plate 12 so that the space above the top of the column 1 is completely enclosed. Within this space is disposed a feeder arm 13 having a nozzle 14 arranged to discharge liquid on to a limited area at the top of the bed 6; the arm 13 is mounted on a rotatable shaft 15 which extends coaxially through the column 1, being journalled in bearings 16, rotation of the shaft 15 being effected by means of a motor (not shown) whose speed is variable so that the angular velocity of the shaft 15 may be set to any value up to three revolutions per hour. In use of the apparatus, a mixture to be separated is fed continuously to the feeder arm 13 from a reservoir 17 by means of a pump 18.

Secured to the plate 7 and extending upwardly from its edge is a ring 19 constituted by superimposed sheets of fine wire mesh, the space within which constitutes a buffer reservoir for an eluting agent. In operation the eluting agent is fed continuously to this reservoir through a pipe 20 extending through the space within the column 1, being pumped from a main reservoir 21 by a pump 22, and seeps to the top of the bed 6 through the porous barrier constituted by the ring 19. The level of the liquid in the buffer reservoir is controlled by the setting of a vertically adjustable drain pipe 23 which also extends through the space within the column 1 and which connects back to the reservoir 21; in practice it has been found desirable for the surface of the liquid to be sufficiently high to ensure that the top of the bed 6 is totally immersed, at least when the mixture to be separated is more dense than the eluting agent.

Liquid is drawn through the column 1 by means of a thirty-channel peristaltic pump 24 which is connected to a series of thirty outlet holes 25 formed in the plate 2 and disposed symmetrically in a ring so as to communicate with the base of the bed 6; the pump 24 has a rating continuously variable in the range of about 1 to 10 liters per hour and discharges to a series of 30 nozzles 26 which are mounted in a fixed plate 27 disposed below the plate 2 and are also disposed symmetrically in a ring centered on the axis of the shaft 15. For the sake of clarity, only two of the channels are indicated in the drawing. It will be appreciated that in order to maintain a supply of liquid in the buffer reservoir the rating of the pump 22 must be appropriately related to that of the pump 24.

The apparatus further includes a distributor comprising two circular plates 28 and 29, mounted on the shaft 15 below the plate 27. In the upper plate 28 is formed a series of 30 conical holes 30 arranged symmetrically in a ring so as to catch the liquid discharged from the nozzles 26, the holes 30 respectively communicating with a series of 30 tubes 31 which respectively terminate in nozzles 32 mounted in the plate 29 in a spiral array, that is so that all the nozzles 32 are at different distances from the axis of the shaft 15. The nozzles 32 are arranged in turn to discharge liquid respectively into a series of 30 concentric circular grooves 33 formed in a fixed plate 34 disposed below the plate 29, each of the grooves 33 having an inclined base so as to vary in depth around its circumference and communicating at the lowest point of its base with an outlet tube 35 through which the liquid collected in that groove is fed to a suitable receptacle (not shown). It will be appreciated that as the plates 28 and 29 rotate with the shaft 15, each of the holes 30 (and hence each of the grooves 33) will receive liquid in succession from all the nozzles 26, in synchronism with the movement of the feeder arm 13. Each constituent of a mixture being separated will thus be directed continuously into a given one or consecutive group of the grooves 33.

The following example may be quoted to illustrate the performance of an apparatus as described above. The bed 6 was constituted by a gel filtration medium having an exclusion limit of 12,000 and a particle size in the range 125 – 250 microns, and the mixture to be separated comprised dextran of molecular weight four million and dinitrophenyl-amino acid; the former is fully excluded while the latter is totally taken into the gel. The mixture was fed at a rate of 18 milliliters per hour to the feeder arm 13, which was rotated at 0.16 revolutions per hour. The eluting agent (0.1 molar sodium chloride) was pumped through the bed 6 at the rate of 3 liters per hour. The angular separation between the centers of the zones in which the two constituents of the mixture were present at the base of the bed 6 was 108° (i.e., nine of the holes 25), more than 90 percent of the dextran being recovered from a group of three of the grooves 33 and more than 90 percent of the dinitrophenyl-amino acid being recovered from a group of four of the grooves 33.

In a modification of the apparatus described above, the flow rate could be increased by feeding the eluting agent to the column under pressure, in which case it may be feasible to dispense with the pump at the output end with consequent saving in cost but with a possible sacrifice of resolution.

We claim:

1. Apparatus for use in continuous liquid chromatography,
   comprising: a stationary annular column disposed with its axis vertical and having a multiplicity of output channels for respectively discharging fractions of the column effluent derived from different regions distributed uniformly around the base of the column, said output channels terminating in a series of nozzles arranged to discharge liquid downwardly and disposed symmetrically around a given vertical axis;
   a first liquid feeding means for continuously feeding a mixture to be separated to a restricted region at the top of the column;
   a second liquid feeding means for continuously feeding an eluting agent uniformly to the whole of the top of the column;
   a stationary receiving member having formed in it a series of upwardly facing circular grooves of different radii all centered on said given axis, said grooves being equal in number to said output channels;
   a series of ducts equal in number to said output channels, said ducts respectively having inlets disposed symmetrically around said given axis below said series of nozzles to receive liquid discharged therefrom and respectively having outlets disposed above said receiving member at different distances from said given axis corresponding respectively to the radii of said grooves; and
   means for rotating said first liquid feeding means uniformly about the axis of the column and synchronously rotating said series of ducts about said given axis so that each duct will receive liquid discharged in succession from said series of nozzles but will throughout discharge into a single one of said grooves.

2. Apparatus according to claim 1, further comprising:
   pumping means for effecting a flow of liquid through the column from the top to the base; and
   means defining a buffer reservoir communicating with the top of the column by way of a porous barrier, said second liquid feeding means being operative to feed the eluting agent to the top of the column through said reservoir.

* * * * *